Nov. 23, 1965     D. H. BAKER ETAL     3,218,840
SYSTEM AND METHOD FOR DETERMINING TRUE MAGNETIC BEARINGS
Filed Sept. 17, 1962     2 Sheets-Sheet 1
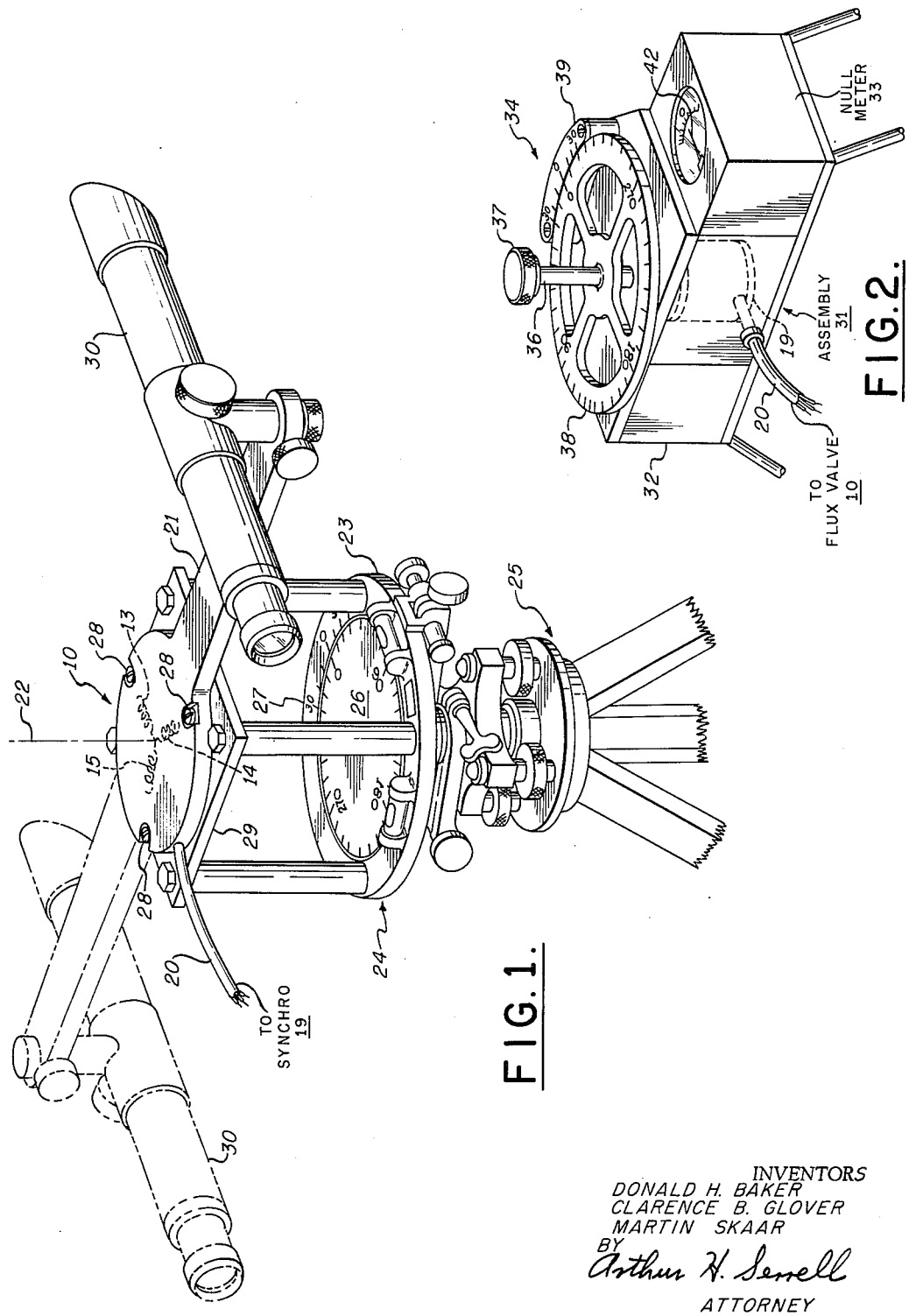
INVENTORS
DONALD H. BAKER
CLARENCE B. GLOVER
MARTIN SKAAR
BY Arthur H. Serrell
ATTORNEY

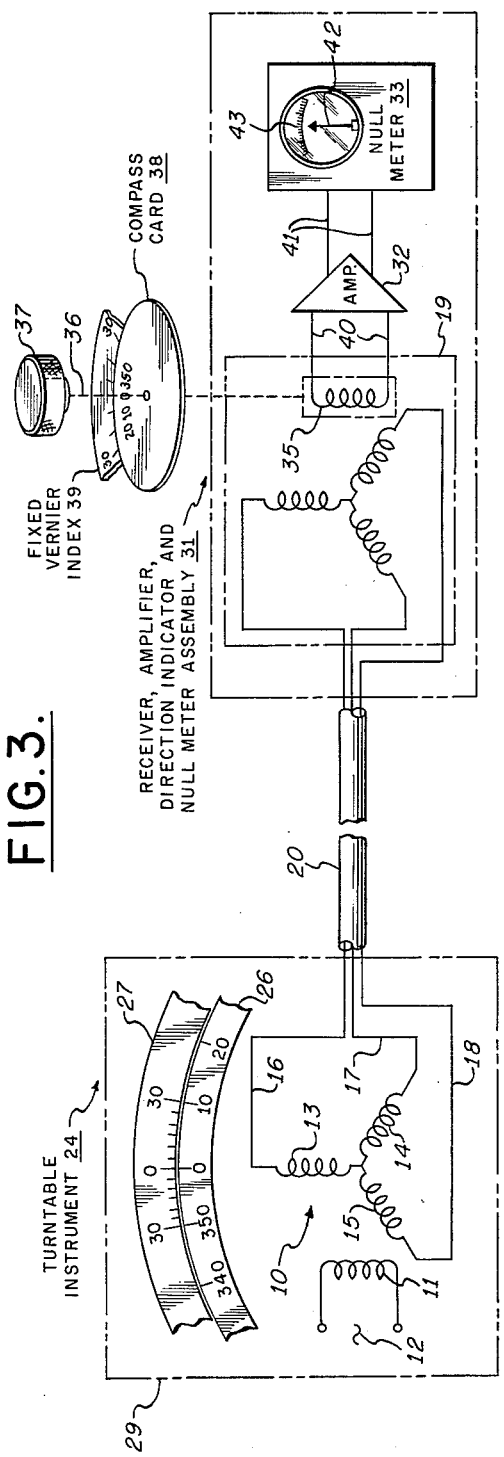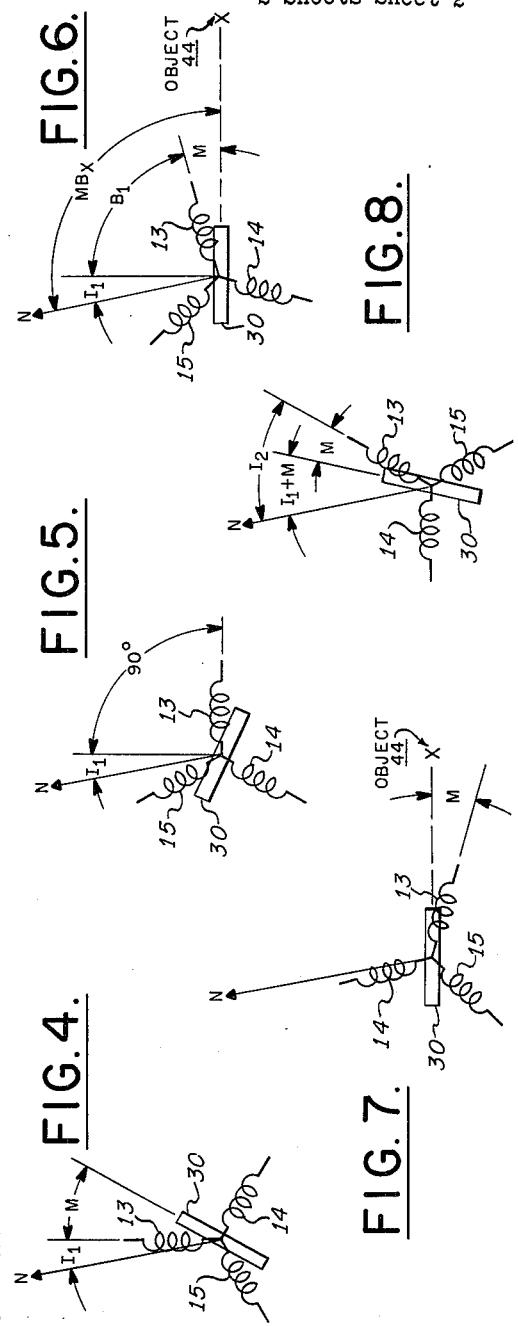

United States Patent Office 3,218,840
Patented Nov. 23, 1965

3,218,840
SYSTEM AND METHOD FOR DETERMINING
TRUE MAGNETIC BEARINGS
Donald H. Baker, Phoenix, Ariz., Clarence B. Glover, Smyrna, Ga., and Martin Skaar, Phoenix, Ariz., assignors to Sperry Rand Corporation, Great Neck, N.Y., a corporation of Delaware
Filed Sept. 17, 1962, Ser. No. 224,173
4 Claims. (Cl. 73—1)

This invention relates to a system responsive to the earth's magnetic field and a method for orienting an electrical output device with respect to the field in determining the true magnetic bearing of a distant object from a point of observation.

The improved system accordingly includes an electrical device such as a magnetometer or flux valve having an output depending on its orientation in the earth's magnetic field. In accordance with the invention, such a device together with a device for sighting a distant object such as a telescope are arranged as parts of an invertible fixture for movement manually about a vertical axis on the turntable of an azimuth indicating instrument having a compass card and an index. The electrical output device and sighting device of the system are fixedly located with respect to the fixture and the provided azimuth relation therebetween is fixed in either of the mounted positions of the invertible fixture on the turntable. In the respective average displacement error determining steps of the method, the fixture and turntable of the indicating instrument are moved manually through a series of equally spaced angles in the range of one revolution of the electrical output device in the earth's magnetic field.

Other electrical elements of the improved system include a rotor type receiver or synchro having a three-phase wound stator and a meter of the null indicating type. To swing the rotor of the receiver through the 360° range of the turntable, it is operatively connected to a manually adjustable means and a directional indicator, having an index and a suitable 360° azimuth scale or compass card. In the improved system, the rotor of the receiver element is adjusted for each of a plurality of angular positions of the turntable so as to null the output of the electrical output device at the receiver to observe the angular error on each angular position on the directional indicator in both non-inverted and inverted positions of the fixture on the turntable. The meter of the system connected to the receiver indicates a null output condition for each of the angular error positions of the improved orienting method.

In the practice of the improved method, the uncorrected bearing of an object distant from the observation point as read on the azimuth indicator in relation to the turntable with the telescope or sighting device on the non-inverted fixture directed on the object is utilized in resetting the inverted fixture and turntable in angular relation to the object.

An object of the present invention is to provide a system of mechanical and electrical elements of the character described that operates with a minimum of moving parts and requires no alignment or calibration.

A feature of the improved system resides in the provision of an invertible fixture for the turntable of the azimuth indicating instrument including an electrical output device responsive to the earth's magnetic field and a sighting device that are located in relatively fixed azimuth relation.

Other objects, features, advantages and practices of the improved system and method will become apparent in the following description of the subject invention in relation to the accompanying drawings, wherein:

FIG. 1 is a perspective view of the azimuth indicating instrument of the improved system showing the invertible fixture on the turntable in both non-inverted and inverted positions, FIG. 2 is a perspective view of an assembly including the receiver or synchro, the directional indicator, amplifier and null meter elements of the improved system, FIG. 3 is a schematic view and wiring diagram of the circuitry connecting the electrical elements of the system including the magnetometer or flux valve, the receiver, the amplifier and the null meter, and FIGS. 4, 5, 6, 7 and 8 are diagrammatic views showing the relation of the output device with respect to the earth's magnetic field in the steps utilized in practicing the improved method.

The earth's field responsive element shown in the drawings is an electrical output device in the form of a magnetometer or three-legged flux valve 10. As shown in FIG. 3, the exciting primary coil 11 of the valve 10 is energized from a suitable source of alternating current electrical energy 12. The secondary coils 13, 14 and 15 arranged in respective one hundred and twenty degree electrically spaced relation provide an output depending on the azimuth position of the valve in the earth's magnetic field. The output leads 16, 17 and 18 for the respective coils 13, 14 and 15 are connected to the three-phase stator of a receiver or synchro 19 by way of shielded cable 20. As represented in FIG. 1, the output coils 13, 14 and 15 of the flux valve 10 are fixedly mounted on an invertible fixture 21 for movement in a horizontal plane about the vertical axis 22 of the turntable 23 of an azimuth indicating instrument 24.

In the practice of the improved method, the instrument 24 is set up in a location where the magnetometer or valve 10 is as free as possible from local influences of disturbing electrical or magnetic fields. The receiver, amplifier and null meter assembly of the system is accordingly located at a distance from the instrument 24. As shown in FIG. 1, instrument 24 includes a tripod base 25 on which the turntable 23 is mounted to be moved manually about axis 22 in relation to a normally stationary compass card 26 connected to the base 25. The vernier index component of the azimuth instrument 24 which is read on the card 26 is located on the turntable 23 as indicated at 27. The instrument includes conventional means for levelling the turntable 23 as well as an interlock between the turntable 23 and card 26 and an interlock between the card 26 and the base 25. With card 26 locked to base 25, the turntable is movable manually through a series of equally spaced angles in relation to the card in a one revolution range such as the angles 0 degrees, 90 degrees, 180 degrees, and 270 degrees on the card 26. The fixture 21 of the instrument 24 is mounted on the turntable plate 29 by means of three screws 28. As shown in FIG. 1, the portion of the instrument provided by the fixture 21 is a horizontal arm that extends from the axis 22 whose other end includes a sighting device or telescope 30 that is connected thereto in fixed azimuth relation to the valve 10. In the full line representation of the fixture parts shown in FIG. 1, the fixture 21 is arranged on the instrument 24 in non-inverted position. The inverted position of the fixture is shown on the same figure with the parts thereof being in dotted lines. In inverting the fixture 21, the fixture 21 is removed from the plate 29 and turned bottom side up before refastening by the same connecting screws. After the inversion, the telescope 30 is located on the underside of the fixture 21 directed in the same direction and the flux valve 10 is inverted so that the legs of the secondary coils 14 and 15 interchange their positions in the earth's magnetic field while the leg of the secondary coil 13 remains similarly oriented. In the average displacement error determining steps of the method, the fixture 21, valve 10, sighting device 30 and index component 27 move as a unit about axis 22 in relation to the compass card 26 of the azimuth instrument 24.

The elements of the improved system located remotely from the instrument 24 are arranged as an assembly 31, FIG. 2, which includes the receiver or synchro 19, a conventional phase sensitive amplifier 32, a meter 33 of the null indicating type, and a directional indicator 34. The manually adjustable means included in the system for the rotor or movable element 35 of the synchro 19 is provided by a shaft 36 with a turn knob 37 thereon. The adjustment of the rotor 35 through a range of 360° corresponding to the movement of the turntable 23 of instrument 24 in azimuth is observed on the indicator 34 by the relation between a compass card 38 fixed to the shaft 36 and an index component fixed to the assembly 31 such as the vernier scale or index 39. As shown in FIG. 3, the receiver or synchro 19 is operatively connected to amplifier 32 by the output leads 40 from the movable element or rotor 35. Leads 41 connect the amplifier 32 to the null meter 33 whose pointer 42 moves to the right or left of an index 43 depending on the sense of the output of the amplifier. The system operates to compare the orientation of the magnetometer or valve 10 in the earth's magnetic field in relation to the orientation of the stator of the receiver or synchro 19 with respect to its rotor 35. In the respective average displacement error determining steps of the improved method, for each of the azimuth positions of the turntable 23, the rotor 35 of the synchro 19 is manually adjusted to null its output so that the pointer 42 is not displaced from the null index 43 of the meter 33. The degree and sense of the manual adjustment required at the knob 37 is indicated by the extent and sense of the movement of the pointer 42 of the null meter 33 from its index position. The index 39 for the card 38 related to the rotor of the synchro or receiver 19 is a vernier scale that enables the card to be read with an accuracy of one minute of arc in determining the directional orientation of the rotor of the system necessary to null the meter 33.

With reference to the FIGS. 4 through 8, inclusive, the instrument 24 is first set up at the point where the direction of magnetic north is to be determined with the turntable 23 level and the fixture 21 mounted thereon in a non-inverted position as indicated in the full line representation thereof in FIG. 1. The valve 10 is operatively connected to the remote assembly 31 and supplied with energy from the source 12. In FIGS. 4 through 8, magnetic north is indicated by an arrow and the designation (N). The unknown angle indicated at ($I_1$) in FIG. 4 represents the angular displacement error between the (N) arrow and the leg of the coil 13 of the valve 10. Angle ($I_1$) is determined in the practice of the improved method by averaging the displacement error at each of a series of equally spaced angles in a range of one revolution of the turntable with the fixture in one of its operative positions. The cyclic errors of the receiving synchro of the system are cancelled out by the practice. Also the angle M indicated in FIG. 4 shows the fixed angular relation between the leg of coil 13 and the line of sight of the telescope 30 on the turntable 23. With the rotor of the receiver 19 adjusted by knob 37 so that card 38 reads an azimuth (O) with relation to the vernier index 39, the turntable is oriented in azimuth manually after the azimuth (O) on the card 26 is fixed at the zero of its related index 27. The card 26 and turntable are moved together to bring the valve 10 to the position indicated in FIG. 4 with a minimum output from the receiver to the meter 33 due to the displacement error of the valve 10, as indicated by the angle $I_1$ in FIG. 4. The knob 37 is then turned manually to null the meter 33, the error angle being determined by the angular relation from (O) of the card 38 and index 39 of the receiver 34. The noted angles $I_1$ and M are both unknown when the procedure is initiated. In the improved method, the displacement error angle $I_1$ is measured as the average of the angular differences between the readings of the azimuth indicator and directional indicator for each of a series of equally spaced angles in the range of one revolution of the turntable 23. In computing the error, the interlocks of instrument 24 are initially adjusted to lock the compass card 26 as well as the turntable to the base with the indicated relation shown in FIG. 1. The output of the receiver 19 to the meter 33 due to the illustrated orientation of the valve 10 with respect to magnetic north is then nulled by manual adjustment of the knob 37 to reset the rotor 35. The displacement error for the first turntable position of the valve 10 is the difference between the readings of the azimuth indicator of the instrument and the directional indicator of the receiver. The displacement error in degrees is read on the directional indicator 34 for all of the positions of the turntable in the earth's magnetic field. For readings above that of the turntable position of zero degrees, the error is positive. Where the readings are less than that of the turntable position, the displacement error is negative.

Similar displacement error readings are recorded for example for each of three other turntable positions with relation to card 26 such as 90°, 180° and 270° where the fixture is in its non-inverted position. For the second of such measurements, the turntable is unlocked from the card 26 and moved clockwise as viewed in FIG. 1 until the index 27 reads 90° in the compass card. The valve 10 is accordingly moved through the same angle with relation to the earth's field as indicated in FIG. 5. After locking the turntable in position to the base at this reading, the knob 37 is rotated clockwise as viewed in FIG. 2 until the receiver or synchro 19 nulls the output of the valve 10 and the meter 33 indicates the null. The displacement error for this position of the turntable is then read on the vernier scale 39. Other error measurements for the azimuth positions of the turntable at 180° and 270° are also obtained. The average error angle $I_1$ indicated in FIG. 4 is equal to the algebraic sum of the four individual error readings at the respective noted turntable headings divided by four. In determining the average displacement error angle $I_1$ as a step in the improved method, the indicator 33 is nulled through adjustment of the rotor 35 for each of a series of equally spaced angles in the range of one revolution of the turntable 23 with the fixture 21 attached to the turntable in one of its operative positions.

With card 26 of instrument 24 locked to base 25 in the position utilized in the displacement error measuring method step, the following step of the improved method utilizes the sighting device or telescope 30 in sighting a distant object 44 as shown in FIG. 6 to determine the uncorrected bearing $B_1$ of the object on the card and index components of the turntable. As indicated in FIG. 6, the correct magnetic bearing $MB_x$ is equal to the algebraic sum of $B_1$, the average displacement error angle $I_1$ and the fixed angle M between the line of sight of the telescope 30 and the axis of the leg of coil 13 of the flux valve or magnetometer 10.

In the following step of the method, the fixture 21 is inverted on the turntable 23 to locate the sighting device or telescope 30 and the valve 10 in the other of its operative positions with the inverted sighting device sighted on the object 44 at the determined uncorrected bearing $B_1$. As shown in FIG. 7, the inversion of the fixture 21 turns the valve 10 about the axis of the telescope 30 by an angle equal to twice the fixed misalignment angle M between the leg of the coil 13 of the valve and the line of sight of the telescope. In making the inversion of fixture 21, the leg of the coil 13 of the valve 10 moves about the axis of the telescope 30 to the position clearly shown in FIG. 7 where its relation to the magnetic north arrow N is increased by a second angle M. In inverting the fixture, the sighting device or telescope is moved about its optical axis through 180 degrees.

In the following resetting step of the method, the turntable 23 is moved in relation to the card 26 to return it to its angular relation with the index 27 shown in FIG. 1 at the start of the series of angles in the first average displacement error determining step. In the described operation, this angular relation is zero degrees. Resetting the turntable 23 as described cancels the uncorrected bearing angle $B_1$ and locates the valve and telescope parts on the inverted fixture in relation to magnetic north as shown in FIG. 8 where the leg of the coil 13 of the valve 10 is displaced from north by an average angle $I_2$ which is equal to the sum of the angles $I_1$ and 2M. As the valve 10 is inverted its output is negative so that the negative displacement error angle ($-I_2$) is equal to the sum of the displacement error angle $I_1$ and 2M. M is accordingly equal to $-(I_1+I_2)$ divided by two.

The average displacement error angle $I_2$ between the valve or magnetometer 10 and the receiver rotor 35 is determined in the next step of the method by nulling the indicator 33 for each of a second series of equally spaced angles in the range of one revolution of the turntable from its reset position in the manner described in determining the average error angle $I_1$. After the error angle $I_2$ is determined, the fixture 21 is returned to its initial non-inverted position on the instrument and with the telescope 30 sighted on the object 44, the card 26 is unlocked from the base 25 and set with relation to the index 27 at the corrected magnetic bearing angle $MB_x$ of the object. This correctly orients the valve 10 with relation to the earth's magnetic field as well as the compass card 26 of the instrument 24. The corrected magnetic bearing angle $MB_x$ of the object 44 is computed from the observed uncorrected bearing angle $B_1$ and the average determined displacement error angles $I_1$ and $I_2$.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A system for determining true magnetic bearings including an instrument having a level turntable movable manually through an azimuth range of 360 degrees in relation to a fixed index, a fixture carried by the turntable having a magnetometer responsive to the horizontal component of the earth's magnetic field and a sighting device with an optical inversion axis mounted thereon in fixed azimuth relation to the magnetometer; a receiver for the output of the magnetometer having a rotor, an element movable through a range of 360 degrees in relation to a fixed index, manually settable means for moving the rotor and element of the receiver to adjust its output; and a meter operatively connected to the rotor for indicating a null output of the system for each of a plurality of azimuth positions of the invertible fixture on the turntable.

2. A system for determining true magnetic bearings including an instrument having a level turntable movable manually about an azimuth axis in a horizontal plane, a fixture carried by the turntable having a flux valve and a telescope with an optical inversion axis mounted thereon in fixed azimuth relation to the flux valve, a synchro having a wound stator connected to the flux valve and a rotor; means for manually adjusting the rotor to change the output of the synchro; and meter means connected to the rotor for indicating a null output of the system for each of a plurality of azimuth positions of the invertible fixture on the turntable.

3. An orienting method for a system responsive to the earth's magnetic field in which a magnetometer and sighting device located in relatively fixed azimuth relation as parts of a fixture movable manually about a vertical axis on a level turntable with compass card and index components and also movable manually about the axis of the sighting device with respect to the turntable through 180 degrees for inversion, in which a receiver includes a wound stator connected to the magnetometer, a manually adjustable rotor and compass card and index components, and in which a null meter connected to the receiver indicates the output of the system, the steps for orienting the magnetometer in the earth's magnetic field in accordance with the true magnetic bearing of a distant object that include firstly moving the turntable and attached fixture through a series of equally spaced angles manually in the range of one revolution of the turntable, adjusting the rotor manually to null the indication of the meter at each of the spaced angles of the turntable, reading the card and index components of the turntable and receiver at each of the spaced angles of the turntable, summing the differences of the readings to determine the average displacement error for the first revolution of the turntable, sighting a distant object along the axis of the sighting device to determine the uncorrected bearing of the object as the card and index components of the turntable, moving the fixture with respect to the turntable about the axes of the sighting device through 180 degrees to invert the magnetometer and sighting device with the axis of the sighting device on the object at the determined uncorrected bearing, resetting the turntable card in the angular relation to its index at the start of the steps on which the turntable was first moved manually, secondly moving the turntable and attached inverted fixture through a second series of equally spaced angles manually in the range of one revolution of the turntable, adjusting the rotor manually to null the indication of the meter at each of the second spaced angles of the turntable, reading the card and index components of the turntable and receiver at each of the second spaced angles of the turntable, and summing the differences of the readings to determine the average displacement error for the second revolution of the turntable.

4. An orienting method for a system responsive to the earth's magnetic field in which a flux valve and telescope located in relatively fixed azimuth relation as parts of a fixture movable manually about a vertical axis on a level turntable with compass card and index components and also movable manually about the axis of the telescope with respect to the turntable through 180 degrees for inversion, in which a synchro includes a wound stator connected to the flux valve, a manually adjustable rotor and compass card and index components, and in which a null meter connected to the synchro indicates the output of the system, the steps for orienting the flux valve in the earth's magnetic field in accordance with the true magnetic bearing of a distant object that include firstly moving the turntable and attached fixture through a series of equally spaced angles manually in the range of one revolution of the turntable, adjusting the rotor manually to null the indication of the meter at each of the spaced angles of the turntable, reading the card and index components of the turntable and receiver at each of the spaced angles of the turntable, summing the differences of the readings to determine the average displacement error for the first revolution of the turntable, sighting a distant object along the axis of the telescope to determine the uncorrected bearing of the object as the card and index components of the turntable, moving the fixture with respect to the turntable about the axes of the telescope through 180 degrees to invert the flux valve and telescope with the axis of the telescope on the object at the determined uncorrected bearing, resetting the turntable card in the angular relation to its index at the start of the steps on which the turntable was first moved manually, secondly moving the turntable and attached inverted fixture through a second series of equally spaced angles manually in the range of one revolution of the turntable, adjusting the rotor manually to null the indication of the meter at each of the second spaced angles of the turntable, reading the card and index components of the turntable and receiver at each of the second spaced angles of the turntable, and summing the differences of the readings to determine the average displacement error for the second revolution of the turntable.

References Cited by the Examiner

UNITED STATES PATENTS

| 6,709 | 9/1849 | Wurdemann | 33—46 |
| 2,132,170 | 10/1938 | Langsner | 33—69 |

ISAAC LISANN, *Primary Examiner.*